(12) United States Patent
Depondt

(10) Patent No.: US 9,387,830 B2
(45) Date of Patent: Jul. 12, 2016

(54) CONNECTING DEVICE FOR THE ARTICULATED CONNECTION OF A WIPER BLADE TO A WIPER ARM, AND AN ADAPTOR

(75) Inventor: Helmut Depondt, Kessel-Lo (BE)
(73) Assignee: Robert Bosch GmbH, Stuttgart (DE)
( * ) Notice: Subject to any disclaimer, the term of this patent is extended or adjusted under 35 U.S.C. 154(b) by 252 days.
(21) Appl. No.: 14/235,164
(22) PCT Filed: Jul. 6, 2012
(86) PCT No.: PCT/EP2012/063261
§ 371 (c)(1),
(2), (4) Date: Jan. 27, 2014
(87) PCT Pub. No.: WO2013/013958
PCT Pub. Date: Jan. 31, 2013
(65) Prior Publication Data
US 2014/0165321 A1 Jun. 19, 2014
(30) Foreign Application Priority Data

Jul. 26, 2011 (DE) ......................... 10 2011 079 783

(51) Int. Cl.
*B60S 1/40* (2006.01)
*B60S 1/38* (2006.01)
(52) U.S. Cl.
CPC .................. *B60S 1/4003* (2013.01);
(Continued)
(58) Field of Classification Search
CPC .... B60S 1/4003; B60S 1/4045; B60S 1/4048; B60S 1/4038; B60S 1/40; B60S 1/4077; B60S 1/4087; B60S 1/387
USPC ....................................... 15/250.32
See application file for complete search history.

(56) References Cited

U.S. PATENT DOCUMENTS 8,959,701 B2 * 2/2015 Kim ..................... B60S 1/387
15/250.32

(Continued)

FOREIGN PATENT DOCUMENTS

CN 101674962 3/2010
DE 102005016486 10/2006

(Continued)

OTHER PUBLICATIONS

International Search Report for Application No. PCT/EP2012/063261 dated Nov. 7, 2012 (3 pages).

*Primary Examiner* — Gary Graham
(74) *Attorney, Agent, or Firm* — Michael Best & Friedrich LLP

(57) ABSTRACT

The invention is based on a connecting device (10) for the articulated connection of a wiper blade (11) to a wiper arm (24, 26, 28, 30, 32, 34), said connecting device having a connecting element (16) which is connected to a supporting element (22) of the wiper blade (11) for conjoint rotation and on which an adaptor (18) is mounted pivotably transversely with respect to the longitudinal direction thereof, said adaptor being able to be fastened releasably and for conjoint rotation to the free end of the wiper arm (24, 26, 28, 30, 32, 34) or to a joining element (36, 38, 40, 42, 44, 46) connected fixedly to the latter, wherein the adaptor (18) has a plurality of means (80, 96, 100, 102, 122, 126, 130, 134, 144) in order to be able to receive different joining elements (36, 38, 40, 42, 44, 46) of different wiper arms (24, 26, 28, 30, 32, 34), wherein the means include stop edges (86), spring latches (88), locking cams (100), spring clips (122) and spring tongues (128, 132) with latching cams (130, 134). It is proposed that the outsides of the side walls (90) of the adaptor (18) have locking cams (100) in the region of the driving end, wherein, in the fitted state, play-compensating ribs (64, 68) of a first or second joining element (36, 38) or of a covering cap (20) of the adaptor (18) engage under the locking cams (100) and bear on the end side against the steps (101) thereof while securing cams (66) which are arranged on the insides of the side walls (48, 108) of the first joining element (36), of the second joining element (38) or of the covering cap (20) in a manner offset in the longitudinal direction relative to the play-compensating ribs (64, 68) with respect to the driven end engage in installation gaps (96) in the side walls (90) of the adaptor (18), said installation gaps running transversely with respect to the play-compensating ribs (64, 68), and wherein, in the fitted state, the first joining element (36), the second joining element (38) or the covering cap (20) are clamped between the installation gaps (96) and a stop edge (86) by the front part (80) which is elastically flexible in the longitudinal direction, wherein the stop edge (86) is arranged at the transition of the front part (80) of the adaptor (18) to the driving part of the adaptor (18).

11 Claims, 9 Drawing Sheets

(52) U.S. Cl.
CPC ............... *B60S 1/387* (2013.01); *B60S 1/4045* (2013.01); *B60S 1/4048* (2013.01); *B60S 1/4077* (2013.01); *B60S 1/407* (2013.01); *B60S 1/4087* (2013.01); *B60S 2001/4054* (2013.01)

(56) References Cited

U.S. PATENT DOCUMENTS

2009/0307862 A1\* 12/2009 Boland ................ B60S 1/3806
15/250.32

FOREIGN PATENT DOCUMENTS

| | | |
|---|---|---|
| DE | 202005021307 | 10/2007 |
| DE | 102009000483 | 4/2010 |
| DE | 102009043695 | 4/2011 |
| DE | 102010041152 | 5/2011 |
| RU | 2381120 | 2/2010 |
| WO | 2004069618 | 8/2004 |
| WO | 2006/106006 | 10/2006 |
| WO | 2006/128763 | 12/2006 |
| WO | WO2011/040743 A2 \* | 4/2011 |

\* cited by examiner

CONNECTING DEVICE FOR THE ARTICULATED CONNECTION OF A WIPER BLADE TO A WIPER ARM, AND AN ADAPTOR

BACKGROUND OF THE INVENTION

The invention is based on a connecting device for the articulated connection of a wiper blade to a wiper arm and an adaptor.

Besides a wiper arm which is driven by a drive unit, windshield wipers for motor vehicles have a wiper blade which is connected in an articulated manner to the wiper arm via a connecting device. Whereas the drive unit and the wiper arm are not considered consumable parts and have service lives that extend over the life of the vehicle, the wiper blade has to be more frequently renewed. In order to replace the wiper blade, it is desirable that said wiper blade can easily be removed from the wiper arm and can be adapted to a plurality of wiper arm types; thus enabling the component diversity to be held to a minimum. Because the wiper arm belongs to the original equipment of the motor vehicle, said wiper arm is greatly influenced by the motor vehicle manufacturer in the shape and design thereof, whereas the wiper blade as a consumable component lies within the sphere of influence of the aftermarket supplier.

In order to meet the requirements mentioned above, concepts were developed in which a connecting element is connected in a rotationally fixed manner to the wiper blade, preferably to the supporting element thereof, and comprises a part of a joint. The joining element can be integrally formed with the supporting element or attached as a separate component to the same. In so doing, said connecting element can be of single- or multiple-part configuration. An adaptor is connected in an articulated manner to the joint part of the connecting element, e.g. a hub or a pivot pin, by means of a corresponding joint part. The adaptor comprises form and operational means, by means of which said adaptor fits to a plurality of types of wiper arms or, respectively, joining elements which can be connected to the respective wiper arm in a rotationally fixed but detachable manner.

A wiper blade comprising a carrier bracket system is known from the WIPO patent application WO 2004 0696 18 A1, in which an adaptor is suited to the articulated connection of a wiper rod having a hook-shaped end as well as to a wiper arm comprising a straight wiper rod and to a wiper arm which is connected to the wiper blade according to the side lock principle.

In addition, a connecting device for the articulated connection of a wiper blade of flat beam construction is known from the German patent application DE 202005021307, said connecting device being suited to different wiper arms. The connecting device comprises at least one one-piece or multi-piece connecting element, which is fixedly, but detachably, connected to a supporting element in the form of spring rails, as well as a bearing element on which or in which a bearing element fixedly connected to the wiper arm is pivotably mounted and if need be comprises one or a plurality of intermediate pieces, by means of which the connecting options of the connecting element can be matched to the receiving means of the joining element of the wiper arm. Said connecting pieces are different for all applications of the connecting device. The connecting device is suited to a wiper arm comprising a hook-shaped end or, respectively, joining element or to an end or, respectively, joining element comprising a lateral bearing pin and a bridge corresponding to a known side lock principle or to a wiper arm comprising an end or, respectively joining element, in which the wiper arm extends substantially in a straight line above the wiper blade and is connected to the connecting element according to the top lock principle.

The German patent application DE 10 2009 000483 A1 discloses a connecting device for a wiper blade of flat beam construction which can be connected in an articulated manner to four different wiper arms or, respectively, joining elements of the wiper arms by means of an adaptor comprising a covering cap. The adaptor has a spring clip at the end thereof facing the drive. Said spring clip extends in a longitudinal direction and has latching cams which project on the outward facing side surfaces thereof and have two stop surfaces towards the driven end. The first stop surface together with the supporting element encloses an acute angle, whereas the second stop surface extends approximately perpendicularly with respect to the supporting element. The adaptor has a button above the spring clip, which button is connected to said adaptor via a spring tongue and projects beyond the upper edges of the side walls of said adaptor. The side walls of said adaptor have respectively a protruding guide rail on the lower edges thereof, a stop being provided on each guide rail.

SUMMARY OF THE INVENTION

According to the invention, the adaptor has locking cams on the outsides of the side walls thereof in the region of the driving end, wherein, in the fitted state, play-compensating ribs of a first or second joining element or of a covering cap of the adaptor engage under said locking cams. Securing cams are arranged on the insides of the side walls of the first joining element, of the second joining element or of the covering cap in a manner offset in the longitudinal direction relative to the play-compensating ribs with respect to the driven end. Said securing cams engage in installation gaps of the side walls of the adaptor, which gaps run transversely with respect to the play-compensating ribs. In addition, in the fitted state, the first joining element, the second joining element or the covering clamp are clamped between the installation gaps and a stop edge by the front part which is elastically flexible in the longitudinal direction, wherein the stop edge is arranged at the transition of the front part of the adaptor to the driving part of the adaptor. As a result, a first or a second wiper arm type can be connected via the same inventive connecting device to the wiper blade.

According to one embodiment of the invention, the stop edge of the adaptor runs concavely in the region of the side walls. In addition, the top wall of front part of the adaptor has a spring latch, which, in the fitted state, overlaps a top wall of the connecting element or of the covering cap and engages in a latching recess of the connecting element or of the covering cap. In so doing, an additional securing of the adaptor relative to the wiper arms or, respectively, the joining elements thereof as well as to the covering cap of the adaptor in the direction of a vertical axis.

When installing the associated joining element or the covering cap of the adaptor, said connecting element or covering cap is held at an incline to the adaptor, so that the play-compensating ribs of said connecting element or covering cap engage under the locking cams of the adaptor and can bear on the end side against corresponding steps. When pivoting the joining element or the covering cap into an extended position, the front part of the adaptor is pushed back by a front side of the joining element or the covering cap; thus enabling the front side of the joining element or the covering cap, which runs concavely in the region of the side walls, to engage in the concave shape of the stop edge of the front part and a spring latch to overlap the top wall of the joining element at the end face of the top wall of the front part, which faces towards the joining element, and to engage in a latching recess at the front edge of the top wall of the joining element or the covering cap. As a result, the top walls of the front part and of the joining element or of the covering cap are flush with each other in the fitted state. In addition, the securing cams, which are arranged in a manner offset in the longitudinal direction relative to the play-compensating ribs with respect to the driven end, engage in installation gaps of the side walls of the adaptor.

The movement of the front part required for opening and closing is achieved by the elastic flexibility of the adaptor. According to one embodiment of the invention, it is thereby proposed that the top wall of the front part has a wall structure which increases the resilience of the spring latch. According to a further embodiment, the side walls of the adaptor can additionally have in each case, at the drive input side of the stop edge, a gap that begins at the upper edge; and, at the drive output side of the securing cam, a gap beginning at the lower edge, wherein the gaps extend up into the central region of the side walls. By means of the gaps, the flexibility of the adaptor can be modified in the longitudinal direction such that an easy installation of the joining element or the covering cap is possible on the one hand and nevertheless a rigid fit that is free of play between the adaptor on the one hand and the joining element or the covering cap on the other hand is also ensured. Two different joining elements of the wiper arm can be attached to the adaptor by means of these connecting options of the adaptor.

Two further options result from the fact that the adaptor is open on the drive input side and has a pressure shaped guide channel extending in the longitudinal direction, at the driving end of which a latching cam is provided that is fastened to a transverse wall by means of a spring tongue, wherein the latching cam is connected via a web to a V-shaped spring clip in the transverse web, the spring arms of which run together in the direction towards the wiper blade and have stop bars on the side edges. The drive-output-side end faces of the stop bars serve as a support layer for rear edges of projections on the side walls of the corresponding joining elements. Said end faces are pushed during installation from the open side of the adaptor over the stop bars, wherein the stop bars move towards the inside. When the end position of the connecting elements is achieved, in which said joining elements bear with the front side thereof against a stop, the stop bars move again towards the outside and engage behind the rear edges of the associated projections. In so doing, the joining elements are resiliently clamped between the stop bars and the stop edge on the front part of the adaptor. In addition, said joining elements can be secured by a latching cam which is connected via a spring tongue to the adaptor and protrudes to some extent beyond the side walls towards the top wall of the covering cap.

A trough-shaped guide channel facilitates the installation of a substantially rectilinear wiper arm in the shape of a solid profile which is rectangular in cross section, wherein said profile can be cranked at the free end thereof and has in practice three variants. This wiper arm is pushed from the open side into the guide channel, the latching cam being pressed downwards at the driving end. The same occurs with a second latching cam that is arranged on a spring tongue in a manner offset with respect to the driven end. Upon reaching the end position of the wiper rod, the end face strikes against a stop. In this position, an opening in the wiper arm is above the first latching cam; thus enabling said latching cam to engage and secure the wiper arm in the longitudinal direction. The play in the direction of a vertical axis can be modified in the region of the front part of the adaptor by means of ribs which are arranged on the inner side of the top wall of the front part.

Besides being covered by the front part of the adaptor, the joining elements can be covered by the front part of the covering cap. In so doing, a particularly nice design results. In addition, the joint parts are protected from weather and dirt; and wind noises are furthermore reduced.

In order to be able to attach a wiper arm according to the side lock principle, the side walls of the covering cap have two through-holes which are aligned with one another and are provided coaxially with respect to first widened portions in the installation gaps of the side walls of the adaptor.

Because the adaptor constitutes the core piece of the connecting device according to the invention, not only the connecting device is to be protected in its entirety but the adaptor is additionally to be protected as an individual component. Further claims are directed to said adaptor.

Further advantages ensue from the following description of the drawings. Exemplary embodiments of the invention are depicted in the drawings. The drawings, the description and the claims contain numerous features in combination. The person skilled in the art will expediently consider the features individually and put them together to form further useful combinations.

DETAILED DESCRIPTION

Figure 1:
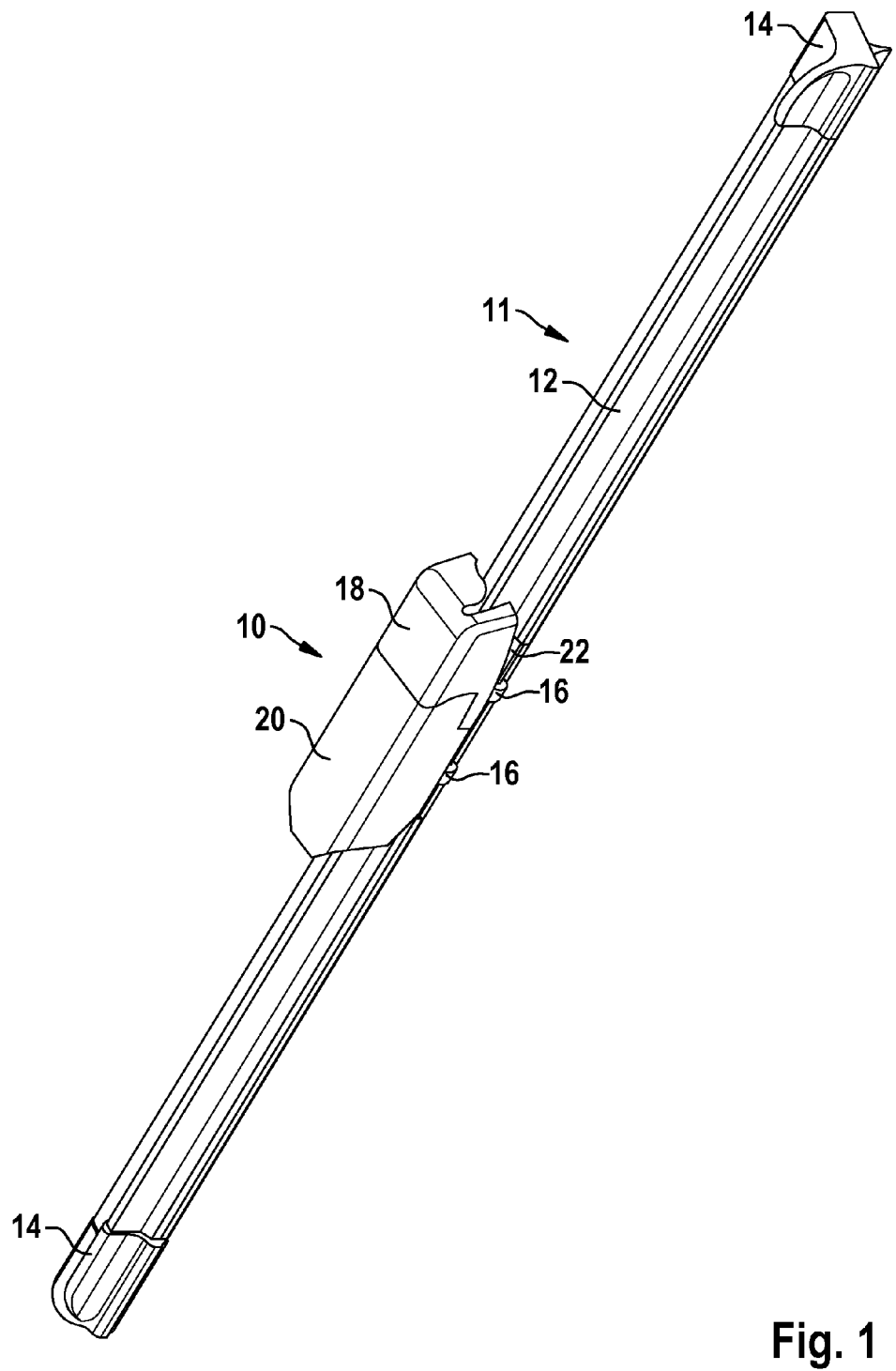
FIG. 1 shows a schematic, perspective view of a wiper blade of flat beam construction according to the prior art.
Figure 2:
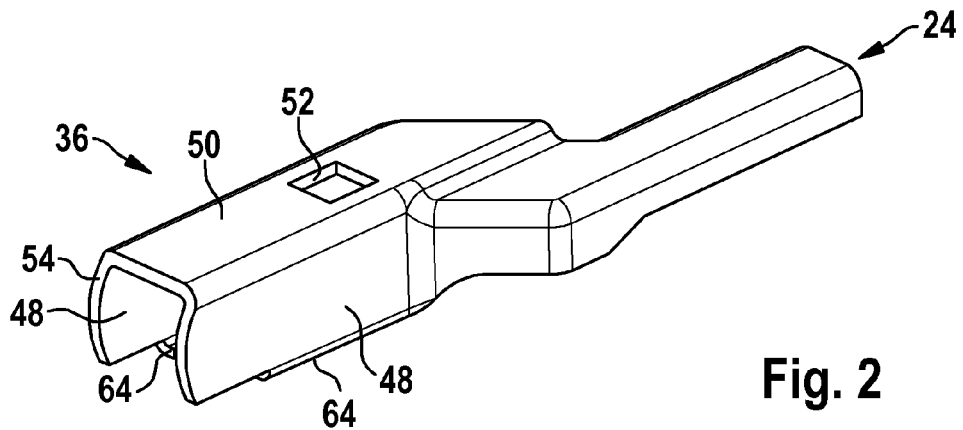
FIGS. 2 to 7 show different joining elements at the ends of different wiper arms.
Figure 3:
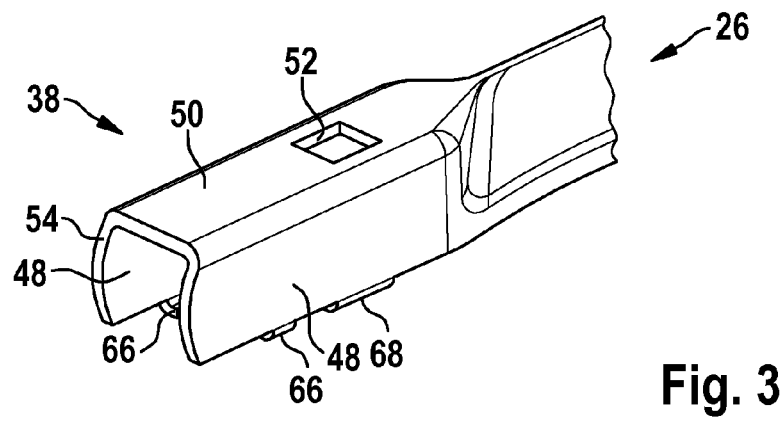
Figure 4:
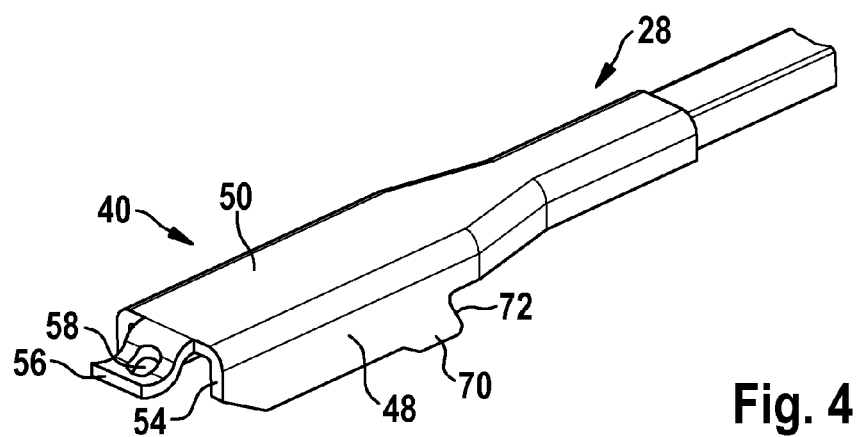
Figure 5:
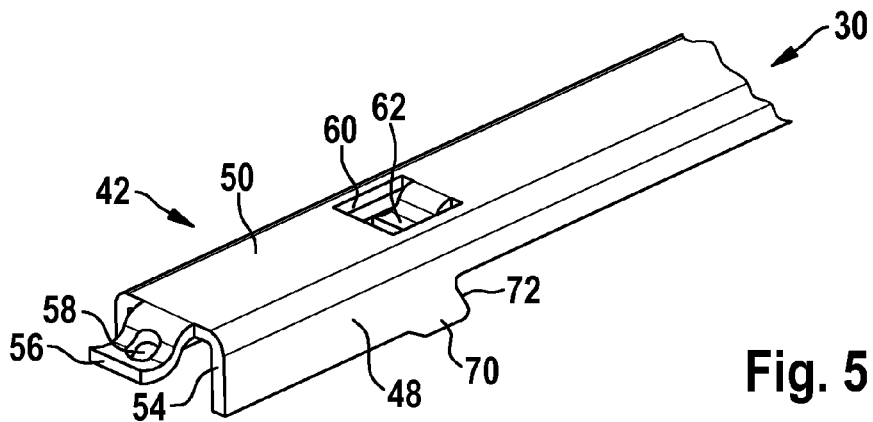
Figure 6:
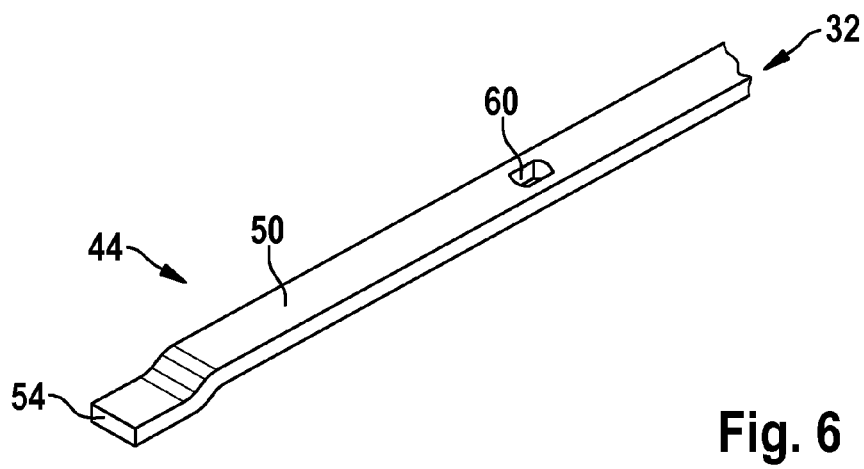
Figure 7:
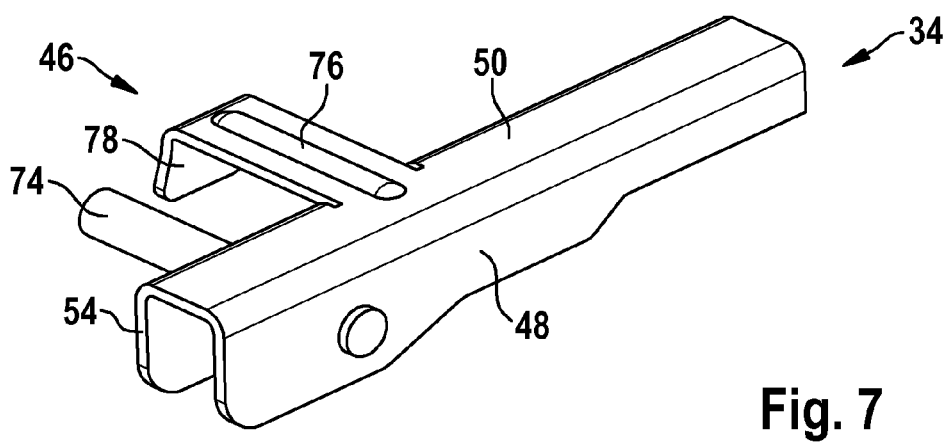
Figure 8:
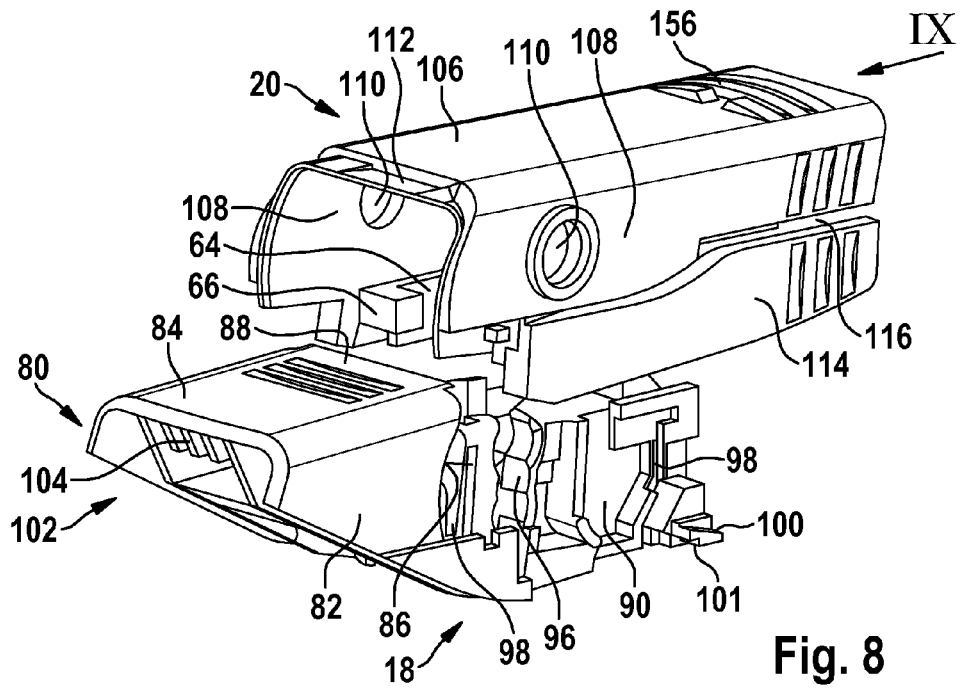
FIG. 8 shows a perspective view of an adaptor comprising a covering cap during installation.
Figure 9:
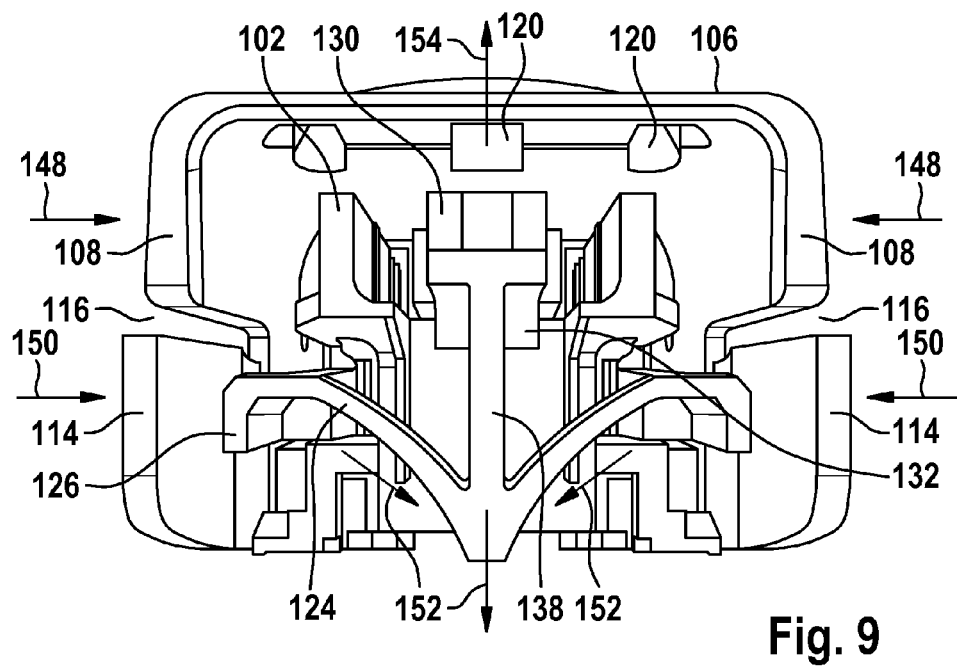
FIG. 9 shows a view in the direction of arrow IX.
Figure 10:
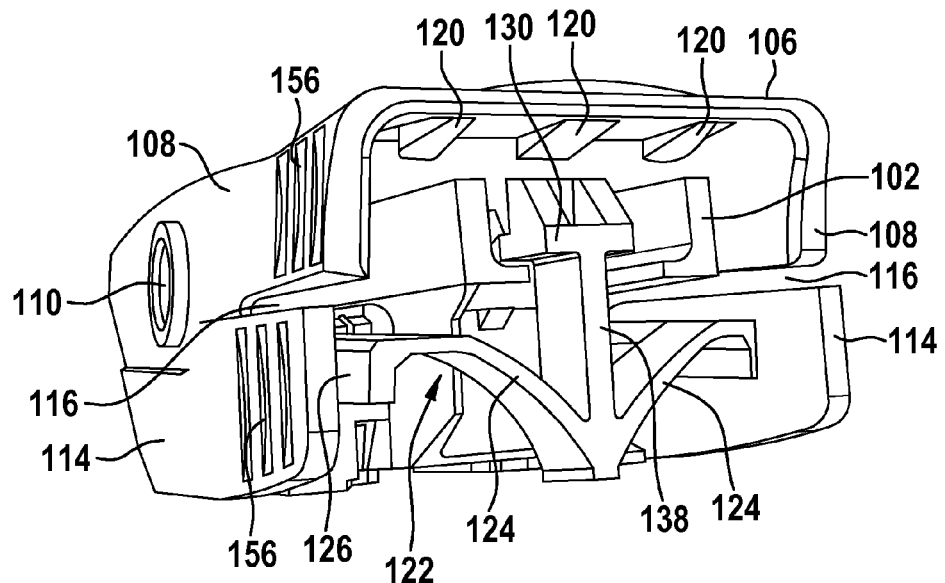
FIG. 10 shows a perspective view pursuant to FIG. 9.
Figure 11:
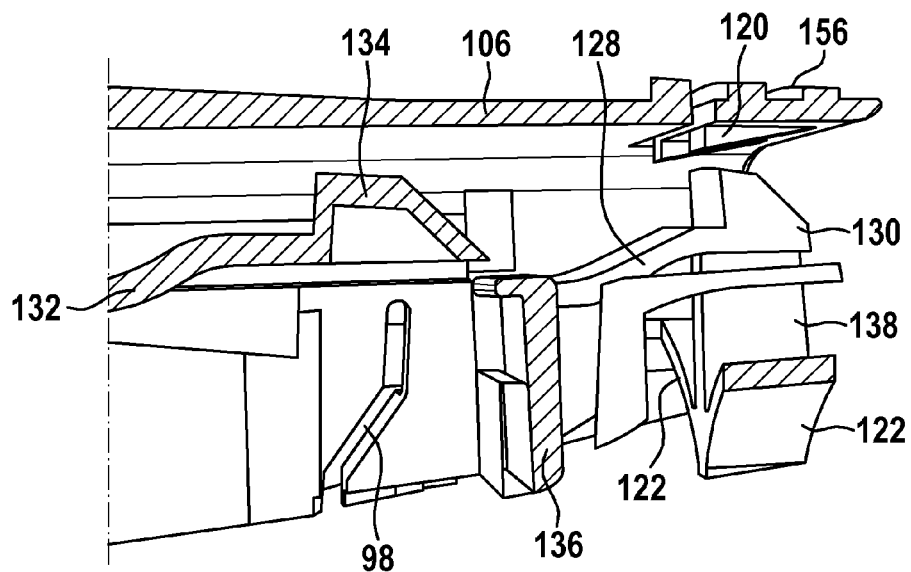
FIG. 11 shows a partial longitudinal section through a part of an adaptor comprising a covering cap.

In the schematic, perspective depiction of a wiper blade 11 in FIG. 1, the general construction of a wiper blade according to the prior art can be seen; however, no details are shown. The wiper blade 11 has support elements 22 in the form of two pre-curved, flat spring rails on which spoilers 12 are fastened in a longitudinal direction to both sides of a connecting device 10, the ends of said spoilers being covered by end caps 14. The connecting device 10 comprises a connecting element 16 in the form of a sheet metal claw, which laterally surrounds the support element with the claws thereof, and an adaptor 18 comprising a covering cap 20.

The adaptor 18, which is mounted pivotably with respect to the longitudinal direction on the connecting element 16, can be connected to wiper arms 24, 26, 28, 30, 32, 34 in a rotationally fixed but releasable manner. Joining elements 36, 38, 40, 42, 44, 46 which are fastened to the free ends of the wiper arms 24, 26, 28, 30, 32, 34 serve this purpose. The joining elements 36 to 46 can be integrally formed on the wiper arms 24 to 34 or be fastened as a separate component in a suitable manner by welding, adhesive bonding, riveting, crimping or the like.

The adaptor 18 has a front part 80, which faces the driven end of the wiper blade 11 and on which the main body is fastened at the driving end thereof. The front part 80 has a U-shaped cross-sectional profile which is open towards the wiper blade 11 and comprises two side walls 82 and a top wall 84. The further side walls are denoted with the reference numeral 90. They are connected to each other between the adaptor 18 and the connecting element 16 by means of transverse walls and bearing means for the joint. The side walls 90 of the adaptor 18 have installation gaps 96 which extend in the direction of a vertical axis and have first widened portions 144 in the region of the upper edge thereof and have second widened portions 146 in the further course thereof towards the lower edge. The side walls 82 of the front part 80 project laterally with respect to the side walls 90 of the adaptor 18. The stop edge 86 formed in this manner is configured concavely in the region of the side walls 82 and fits to a front side 54 of the covering cap 20 or of the first and second joining element 36, 38 of the first and second wiper arm 24, 26.

A gap 98 runs respectively from the upper edge of the side walls on the drive input side of the stop edge 86, said gap extending approximately to the center of the side wall 90. A similar gap 98 is located at the driving end of the adaptor 18, which gap however extends from the lower edge of the side wall 90 up into the center region. A locking cam 100 comprising a step 101 is integrally formed on the outer side of the side wall 90 on the drive output side of the gap 98 at the driven end. A trough-shaped guide channel 102 is located in the front part 80 below the top wall 84, in which channel ribs 104 protrude from the top wall 84. Said ribs reduce the cross section of the guide channel 102 in accordance with the cross-sectional shape of the fifth joining element 44 to be received. The ribs 104 can simultaneously serve as stops for the end faces of the corresponding wiper arms 34. The top wall 84 of the front part 80 has a spring latch 88, the resilient properties of which can be modulated by a suitable wall structure 156, on the side facing the covering cap 20. The spring latch 88 fits into a latching recess 112 which is integrally formed on the front side of a top wall 106 of the covering cap 20.

The covering cap 20 forms with the top wall 106 thereof and the side walls 108 a U-shaped cross-sectional profile that is open towards the adaptor 18. First play-compensating ribs 64 comprising locking cams 66 are integrally formed on the inner sides of the lower edges of the side walls 108. During installation, the covering cap 20 is rotated to such an extent that the first play-compensating ribs 64 engage under the locking cams 100 and the drive-input-side end faces can be supported on the steps 101. When being pivoted into the starting position, the front part 80 is displaced by the front side 54 of the covering cap 20 which is made possible by the elasticity of the adaptor 18. In so doing, the spring latch 88 can engage above the front side 54 of the top wall 106 and latch into the latching recess 112. The convex end faces of the side walls 108 are simultaneously supported on the concave stop edge 86; thus enabling the covering cap 20 to be retained in a play-free manner between the locking cams 100 on the one hand and the stop edge 86 on the other hand when the front part 80 resiliently moves back into the starting position thereof.

A first latching cam 130, which is connected to a transverse wall 136 via a spring tongue 132, is located on the driving end of the adaptor 18. In addition, a V-shaped spring clip 122 is connected via a web 138 to the latching cam 130. Spring arms 124 of the spring clip 122 meet at the tip of a V which faces the wiper blade 11. Stop bars 126 running in the longitudinal direction are integrally formed on the lateral edges of the spring arms 124. Said stop bars 126 run spaced apart at a short distance from and approximately parallel to the insides of the lateral wings 114 of the covering cap 20. The lateral wings 114 are formed by parts of the side walls 108 of the covering cap 20, from which said wings are partially set apart by gaps 116 that start at the driving end of the covering cap 20 and extend to a certain extent towards the driven end. If pressure is exerted at the ends of the lateral wings 114 in the direction of the arrows 150, the stop bars 126 are pressed to the inside, whereby the spring arms 124 deform in the direction of the arrows 152 and release the latching cams 130. In addition, locking cams 120 are arranged on the inside of the top wall 106, which cams can be released by pressure being exerted onto the side walls 108 in the direction of the arrows 148 causing the top wall 106 to arch outwards. In order to facilitate this action with a minimum expenditure of force, it is expedient to furnish the region of the top wall 106 and the side walls 108 with a suitable wall structure 156 which promotes the resiliency of the walls in this region. A second latching cam 134 which is connected to the adaptor 18 via a spring tongue 132 is arranged in a manner offset in the longitudinal direction towards the driving end with respect to the first latching cam 130.

Figure 12:
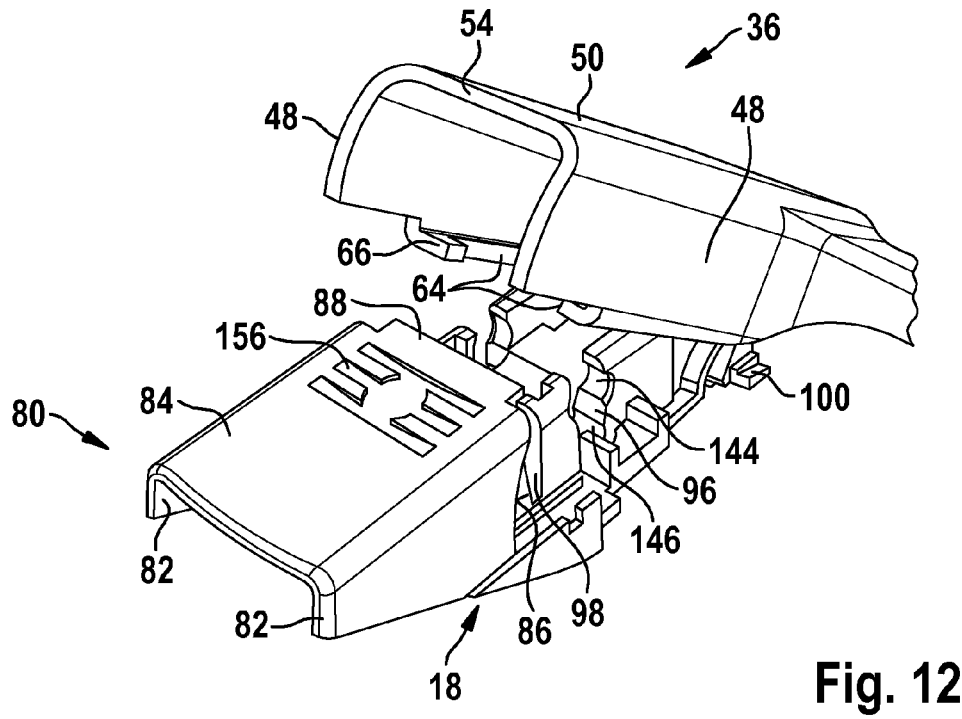
FIGS. 12 to 18 show perspective views of different joining elements during installation.
Figure 13:
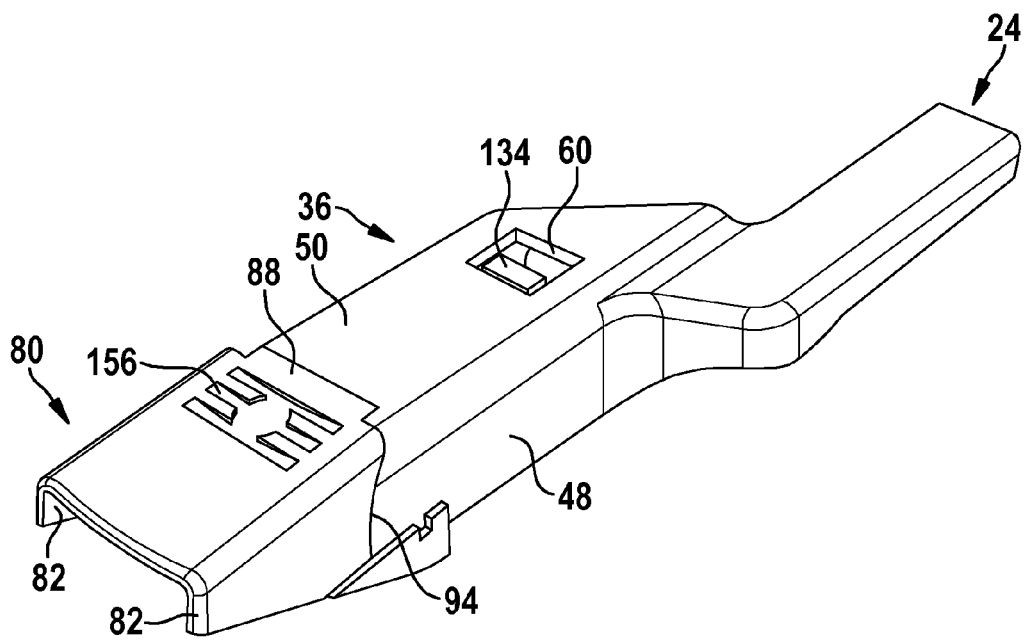
Figure 14:
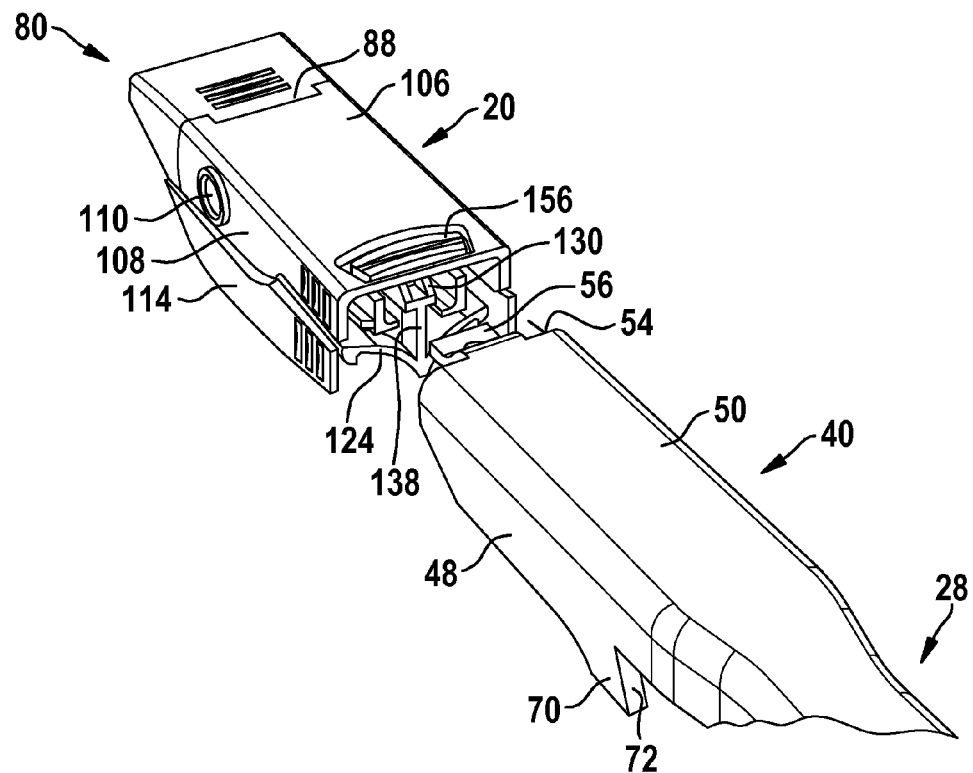
Figure 15:
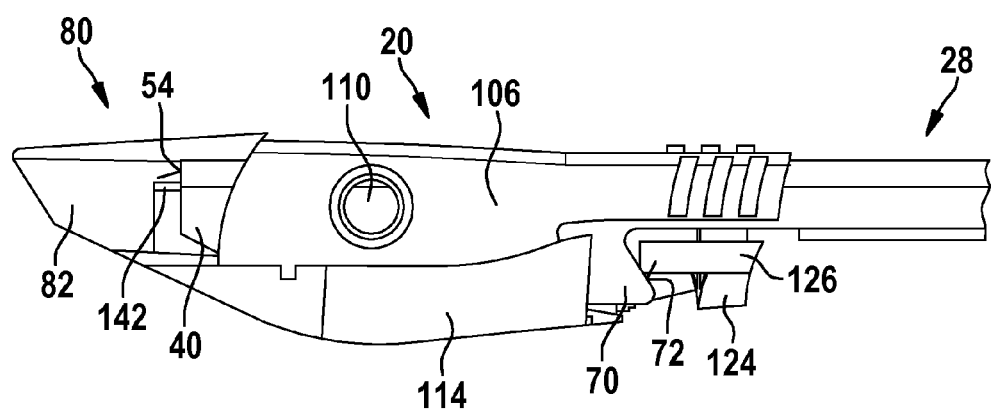
Figure 16:
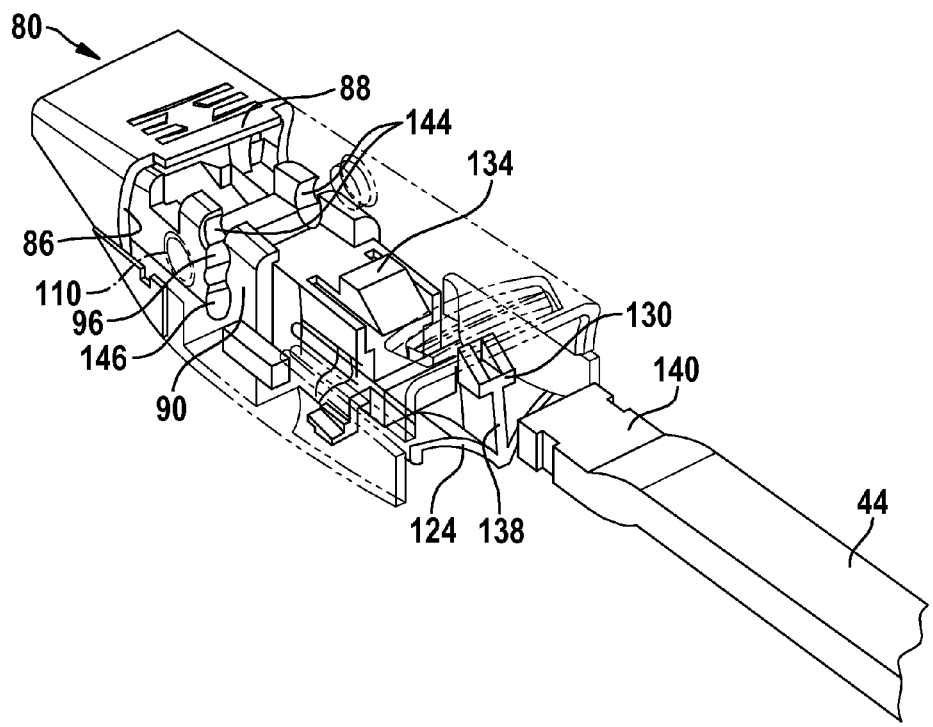
Figure 17:
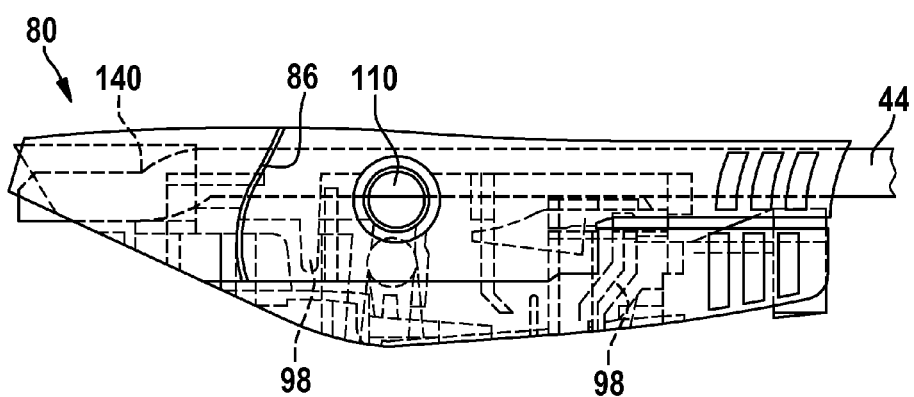
Figure 18:
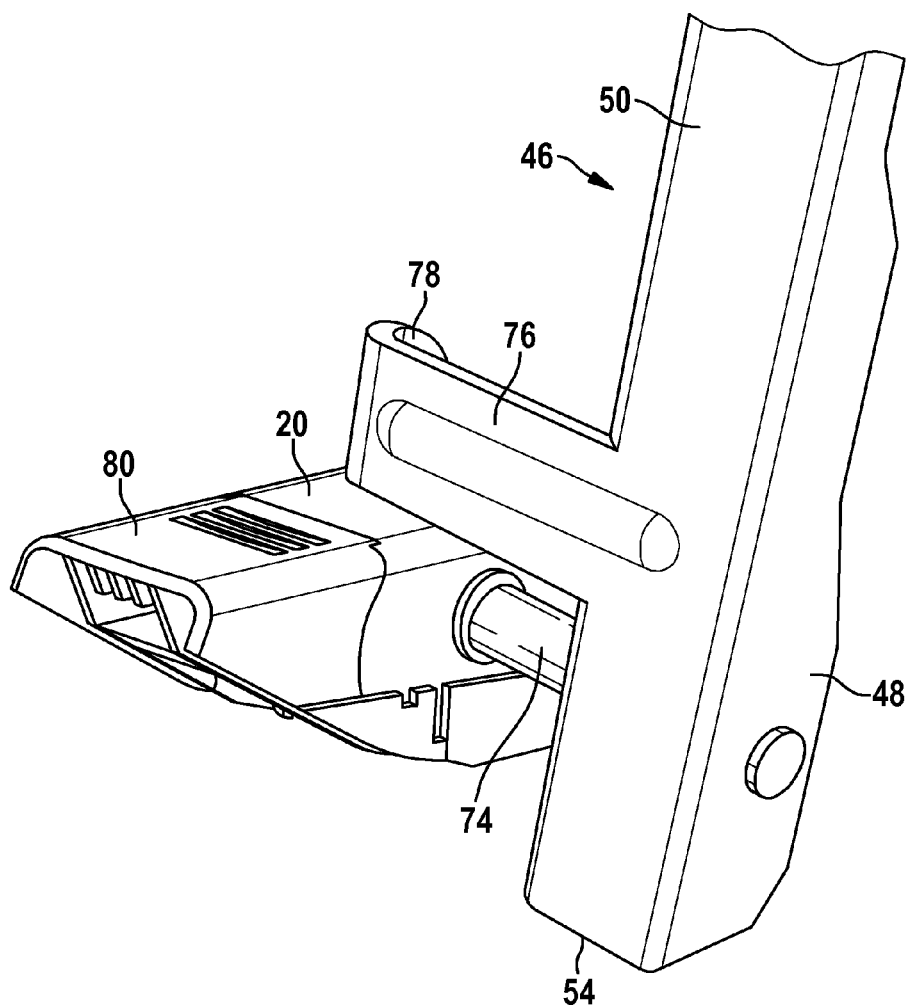

FIG. 12 shows the first joining element 36 being mounted to the adaptor 18. In this case, the covering cap 20 is not used. When mounting the first wiper arm 24 comprising the joining element 36 thereof, said joining element 36 is held at a certain angle with respect to the adaptor; thus enabling the first play-compensating rib 64 to be pushed under the locking cams 100 until said rib bears on the end side against the steps 101 thereof. When the first joining element 36 is pivoted back, the securing cams 66 on the first play-compensating ribs 64 are pushed into the installation gaps 96, wherein the front part 80 is moved forward as a result of the further pivoting motion so that the front side of the first joining element 36 comes to rest at the concave stop edge 86 of the front part 80. In the end position, the front part 80 of the adaptor 18, due to the elasticity thereof, moves with the spring latch 88 thereof over the top wall 50 of the first joining element 36 and engages there in a latching recess 112. The first joining element 36 is thereby secured in the direction of a vertical axis by the spring latch 88 and the locking cams 100, while said first joining element is braced in the longitudinal direction by the step 101, the securing cam 66 and the stop edge 86. The elasticity and resilience of the adaptor 18, which produces the play-free bracing between the adaptor 18 and the first joining element 36, can on the one hand be modified by the gap 98 in the side walls 90 of the adaptor 18 and on the other hand by wall structures 156 in the top wall 84 of the front part 80.

The first wiper arm 24 runs laterally offset with respect to the first joining element 36, while the second wiper arm 26 runs in the longitudinal direction with respect to the second joining element 38. In addition, the second joining element 38 has second play-compensating ribs 68, which have a shorter extension in the longitudinal direction. Furthermore, a locking cam 66 separated from the second play-compensating rib 68 is provided so as to be spaced apart from the second play-compensating ribs 68 in a manner offset in the longitudinal direction with respect to the driven end. These differences are however irrelevant for mounting to the adaptor 18; thus enabling the second joining element 38 to be mounted in the same manner as the first joining element 36 to the adaptor 18. The joining elements 36, 38 have openings 52 in the top walls 50 thereof, which openings fit a latching cam 134 of the adaptor 18, whereby the joining elements 36, 38 can be additionally secured.

The covering cap 20 is initially mounted on the adaptor 18 when fitting the third wiper arm 28 comprising the third joining element 40 thereof and the fourth wiper arm 30 comprising the fourth joining element 42 thereof. The third joining element 40 and the fourth joining element 42 have respectively a cranked lug 56, which has an opening 58, integrally formed on the front sides 54 thereof. They are mounted in the same manner. The connecting element 40 is pushed from the driving end into the interstice between the adaptor 18 and the covering cap 20, wherein the latching cam 130 and the latching cam 134 are consecutively pressed backwards. The stop bars 126 on the spring arms 124 are simultaneously pressed inwards by the side walls 48 of the joining element 40 until the front side 54 of the third joining element 40 strikes against a stop 142 in the front part 80 of the adaptor 18. In this end position, the stop bars 126 reach the rear edges of the projections 70 on the side walls 48, wherein said stop bars again assume the starting position thereof due to the elasticity of the spring arms 124; thus enabling the third joining element 40 to be secured in the longitudinal direction between the stop 142 and the end faces of the stop bars 126. For the purpose of disassembly, pressure is exerted in the direction of the arrows 150 on the lateral wings 114 of the covering cap 20, whereby the stop bars 126 are displaced inwards so that the third connecting element 40 is again released in the longitudinal direction.

The fourth joining element 42 differs for mounting substantially by virtue of the fact that the rear edge 72 on the projection 70 runs perpendicularly to the top wall 50 of the fourth joining element 42 and said fourth joining element has an opening 60 with a lug 62 in the top wall 50. These differences do not affect the mounting of said joining element to the adaptor 18.

The fifth joining element 44 of the fifth wiper arm 32 is a substantially straight bar profile with a rectangular solid cross section and a cranked end 140 which is pushed in the longitudinal direction into the guide channel 102, wherein the latching cam 130 and then the latching cam 134 are initially pressed backwards until the end face of the fifth joining element 44 achieves the end position, in which the latching cam 130 engages in the opening 60 of the fifth joining element 44. From the inside of the top wall 106, a locking cam 120 engages simultaneously from above in the opening 60; thus enabling the fifth joining element 44 to be additionally secured from above in the longitudinal direction by the covering cap 20. For the purpose of disassembly, pressure is applied on the stop bars 126 in the direction 150, whereby the spring arms 124 of the wing 122 are deformed in the direction of the arrows 152 so that the latching cam 130 is released via the web 138. By applying pressure to the side walls 108 of the covering cap 20 in the direction of arrows 148, the top wall 106 arches, whereby the locking cam 120 on the inside moves in the direction of the arrow 154 and releases the fifth joining element.

The sixth joining element of the sixth wiper arm 34 is mounted in the usual manner. In so doing, the sixth joining element is rotated by a certain angle value about a bearing pin 74 so that a bridge 76 can be pushed with the angled end 78 thereof over the covering cap 20, wherein the bearing pin 74 is pushed through the through-openings 110 and the first widened portions 144 of the installation gaps 96. When pivoting back into the starting position, the angled end 78 engages above the covering cap 20 and bears on the adjacent side wall of the covering cap 20. The position of the sixth joining element 46 is thereby secured in the longitudinal direction of the bearing pin 74.

The invention claimed is:

1. A connecting device (10) for the articulated connection of a wiper blade (11) to a wiper arm (24, 26, 28, 30, 32, 34), said connecting device having a connecting element (16) which is connected to a supporting element (22) of the wiper blade (11) for conjoint rotation and on which an adaptor (18) is mounted pivotably transversely with respect to a longitudinal direction thereof, said adaptor being configured to be fastened releasably and for conjoint rotation to a free end of the wiper arm (24, 26, 28, 30, 32, 34) or to a joining element (36, 38, 40, 42, 44, 46) connected fixedly to the free end of the wiper arm, wherein the adaptor (18) has a plurality of means (80, 96, 100, 102, 122, 126, 130, 134, 144) in order to be able to receive different joining elements (36, 38, 40, 42, 44, 46) of different wiper arms (24, 26, 28, 30, 32, 34), wherein the means include stop edges (86), spring latches (88), locking cams (100), spring clips (122) and spring tongues (128, 132) with latching cams (130, 134), characterized in that outsides of side walls (90) of the adaptor (18) have locking cams (100) in a region of a driving end, wherein, in a fitted state, play-compensating ribs (64, 68) of a first or second joining element (36, 38) or of a covering cap (20) of the adaptor (18) engage under the locking cams (100) and bear on an end side against steps (101) thereof while securing cams (66) which are arranged on insides of side walls (48, 108) of the first joining element (36), of the second joining element (38) or of the covering cap (20) in a manner offset in the longitudinal direction relative to the play-compensating ribs (64, 68) with respect to the driven end engage in installation gaps (96) in the side walls (90) of the adaptor (18), said installation gaps running transversely with respect to the play-compensating ribs (64, 68) and in that, in the fitted state, the first joining element (36), the second joining element (38) or the covering cap (20) are clamped between the installation gaps (96) and a stop edge (86) by a front part (80) which is elastically flexible in the longitudinal direction, wherein the stop edge (86) is arranged at a transition of the front part (80) of the adaptor (18) to a driving part of the adaptor (18).

2. The connecting device (10) according to claim 1, characterized in that the stop edge (86) of the adaptor (18) runs concavely in a region of the side walls (82) and has a spring latch (88) in a region of a top wall (84) of the front part (80) of the adaptor (18), said spring latch, in the fitted state, overlapping a top wall (50) of the first or second joining element (26, 28) or of the covering cap (20) and engaging in a latching recess (112) of the joining element (26, 28) or of the covering cap (20).

3. The connecting device (10) according to claim 2, characterized in that the top wall (84) of the front part (80) has a wall structure (156) which increases flexibility of the spring latch (88).

4. The connecting device (10) according to claim 1, characterized in that the side walls (90) of the adaptor (18) have respectively a gap (98) starting at an upper edge on a drive input side of the stop edge (86) and a gap (98) starting at a lower edge on a drive output side of the locking cams (100), wherein the gap (98) extends up into a central region of the side walls (90).

5. The connecting device (10) according to claim 1, characterized in that the adaptor (18) is open on the drive input side and has a trough-shaped guide channel (102) which runs longitudinally and is provided with a latching cam (130) on a driving end thereof, said latching cam being fastened to a transverse wall (136) by means of a spring tongue (128), wherein the latching cam (130) is connected via a web (138) to a spring clip (122) which is V-shaped in cross section and spring arms (124) of which run together in a direction towards the wiper blade (10) and have stop bars (126) on side edges, which stop bars project laterally over the side walls (90) of the adaptor (18).

6. The connecting device (10) according to claim 5, characterized in that a second latching cam (134) is fastened via a further spring tongue (132) to the adaptor (18) towards a driven end of said adaptor (18) in a manner offset with respect to the first latching cam (130).

7. The connecting device (10) according to claim 5 comprising a covering cap (20), characterized in that the side walls (108) of the covering cap (20), starting at driving ends thereof, have in each case a gap (116) running in the longitudinal direction, by means of which a lateral wing (114) is respectively formed in a lower region of an associated side wall (108), via which lateral wing lateral pressure can be exerted on the stop bars (126) of the spring clip (122) in order to release the latching cam (130).

8. The connecting device (10) according to claim 7, characterized in that locking cams (120) are provided on an inside of a top wall (106) of the covering cap (20), said locking cams releasing when pressure is applied to the side walls (108) at the driving end above the lateral wings (114).

9. The connecting device (10) according to claim 7, characterized in that the side walls (108), the lateral wings (114) and the top wall (106) of the covering cap have a wall structure at the driving end, which improves flexibility and the handling.

10. The connecting device (10) according to claim 7, characterized in that the side walls (108) of the covering cap (20) have two through-holes (110) which are aligned with one another and are arranged coaxially with respect to widened portions (144) in the installation gaps (96) of the side walls (90) of the adaptor (18).

11. The connecting device (10) according to claim 5, characterized in that longitudinal ribs (104), which can serve to guide a fifth joining element (44) and as a stop for the same, are arranged at a driven end of the guide channel (102).

* * * * *